United States Patent
Carriere

[19]

[11] Patent Number: 6,129,402

[45] Date of Patent: Oct. 10, 2000

[54] PLASTIC FLOOR LINER FOR VAN OR LIKE VEHICLE WITH A CENTRAL REMOVABLE RUBBER PANEL FLANKED BY RIBBED SIDE PORTIONS

[75] Inventor: Robert Wilfred Carriere, North Bay, Canada

[73] Assignee: Vanliner Technologies Inc., Toronto, Canada

[21] Appl. No.: 09/015,892

[22] Filed: Jan. 30, 1998

[51] Int. Cl.[7] .................................................. B60R 13/01
[52] U.S. Cl. .......................................................... 296/39.1
[58] Field of Search ................................ 296/39.1, 39.2; 15/161, 215, 216, 217; 52/177

[56] References Cited

U.S. PATENT DOCUMENTS

| | | | |
|---|---|---|---|
| 348,782 | 9/1886 | Sawyer | 52/177 |
| 3,578,738 | 5/1971 | Hughes | 15/215 |
| 3,814,473 | 6/1974 | Lorenzen, Jr. | 296/39 R |
| 4,279,439 | 7/1981 | Cantieri | 296/39 R |
| 4,849,269 | 7/1989 | Grace | 428/81 |
| 4,877,281 | 10/1989 | Altmann | 296/39.1 |
| 4,879,151 | 11/1989 | Ellingson, Jr. | 428/53 |
| 4,917,431 | 4/1990 | McDonald | 296/39.1 |
| 5,139,300 | 8/1992 | Carriere | 296/39.1 |
| 5,236,753 | 8/1993 | Gaggero et al. | 428/43 |
| 5,540,473 | 7/1996 | Bills, Sr. | 296/39.2 |
| 5,648,031 | 7/1997 | Sturtevant et al. | 264/80 |
| 5,683,132 | 11/1997 | Danzo et al. | 296/37.6 |
| 5,795,006 | 8/1998 | Beckstrom | 296/39.2 |
| 5,919,540 | 7/1999 | Bailey | 428/67 |

FOREIGN PATENT DOCUMENTS

| | | | |
|---|---|---|---|
| 2065469 | 7/1981 | United Kingdom | 15/215 |

*Primary Examiner*—D. Glenn Dayoan
*Assistant Examiner*—Paul Chenevert
*Attorney, Agent, or Firm*—Pearne & Gordon LLP

[57] ABSTRACT

A vanliner floor comprised of two-part construction. The first part being a one-piece formed plastic material which is heavily ribbed on both sides of a recessed center. The second part is rubber or a recycled tire runner that fits in the recessed center. The floor is formed to contour all of the vehicle features such as a wheel well, gas intake covers and door entrance trims. The plastic floor is made in one piece in order to cover a complete van floor, and still be installable through van door openings. The floor has a flexible center section with a rubber runner insert to provide a non-skid walking surface for loading and unloading of parcels in the cargo area of the van.

1 Claim, 2 Drawing Sheets

PLASTIC FLOOR LINER FOR VAN OR LIKE VEHICLE WITH A CENTRAL REMOVABLE RUBBER PANEL FLANKED BY RIBBED SIDE PORTIONS

FIELD OF THE INVENTION

This invention relates to a floor liner for utility and delivery vans.

BACKGROUND OF THE INVENTION

Small and mid size delivery and utility vans are a great asset to the maintenance of our economic infrastructure. They serve a multitude of functions from delivering food, parcels and heavy equipment to being workshops on wheels.

One aspect of the present invention is to provide an improved van floor liner.

The problem with most present floor materials is that they are not water or chemical proof and thereby offer no protection to the vehicle against rust, bacterial growth or chemical burn. The carrying of food products and other materials requires the van floor to be washed on a regular and constant basis. Choosing a plastic floor may appear to be an obvious solution, however, such a floor is so slippery when wet that a person may easily slip and fall walking from one end to the other. A little snow or mud on a person's boots and the floor is also dangerous.

Another solution has been a rubber floor. However, it also has its drawbacks. Large pieces of equipment and skids of materials are often placed into these vans using a fork lift truck. The result is that the inserting and removing of these items will grab and tear at the rubber until it is ripped out of the van. A rubber floor also has the disadvantage of being unable to seal the van floor completely for pressure or normal washing.

The vans to which the present invention pertains are half-ton, three-quarter ton and cube vans. These vans typically have cargo floor lengths of seven feet or more. The result is that the driver or user cannot simply reach into the van, but must walk in to access cargo. These vans are also used as portable work stations whereby the driver/user must constantly be walking back and forth the length of the van. This results in the need for a non-slip surface.

Thus, one aspect of the present invention is to create a van liner floor that is safe to walk on and tough enough to take all forms of loads. The form should be totally water and chemical proof, cover a total van floor surface and be installed through a four foot door opening.

Another aspect of this invention is to effectively provide a van floor liner that has a non-slip surface while also having a sealed durable plastic surface that allows cargo to be slid into the van's total length. The design of the floor liner also allows for a six foot wide floor to be easily installed through a four foot door opening.

The plastic formed floor has the added advantage of being formed to contour all van wheel well covers and other features.

When the floor liner is combined with a wall liner the floor can be plastic welded to the walls creating a completely sealed and totally pressure washable van interior. This is especially advantageous for food delivery where sanitation is of the utmost importance.

SUMMARY OF THE INVENTION

There is provided a new and useful van floor liner to protect vehicle cargo area floors, while offering safety and cleanliness in all operating circumstances.

The floor comprises a two-part construction. The first part is a one-piece formed plastic material heavily ribbed on both sides of a recessed center. The second part is a rubber or recycled tire runner that fits in the recessed center. The floor is formed to contour all of the vehicle features such as wheel wells, gas intake covers, and door entrance trims.

The design function is to construct a plastic floor in a single piece in order to cover the complete van floor while still being installable through the van door opening. The floor liner allows cargo to be slid into the van on the plastic ribbing while the rubber forms a non-slip surface for human travel.

BRIEF DESCRIPTION OF THE DRAWINGS

In drawings that illustrate the present invention by way of example.

DETAILED DESCRIPTION OF THE DRAWINGS

Figure 1:
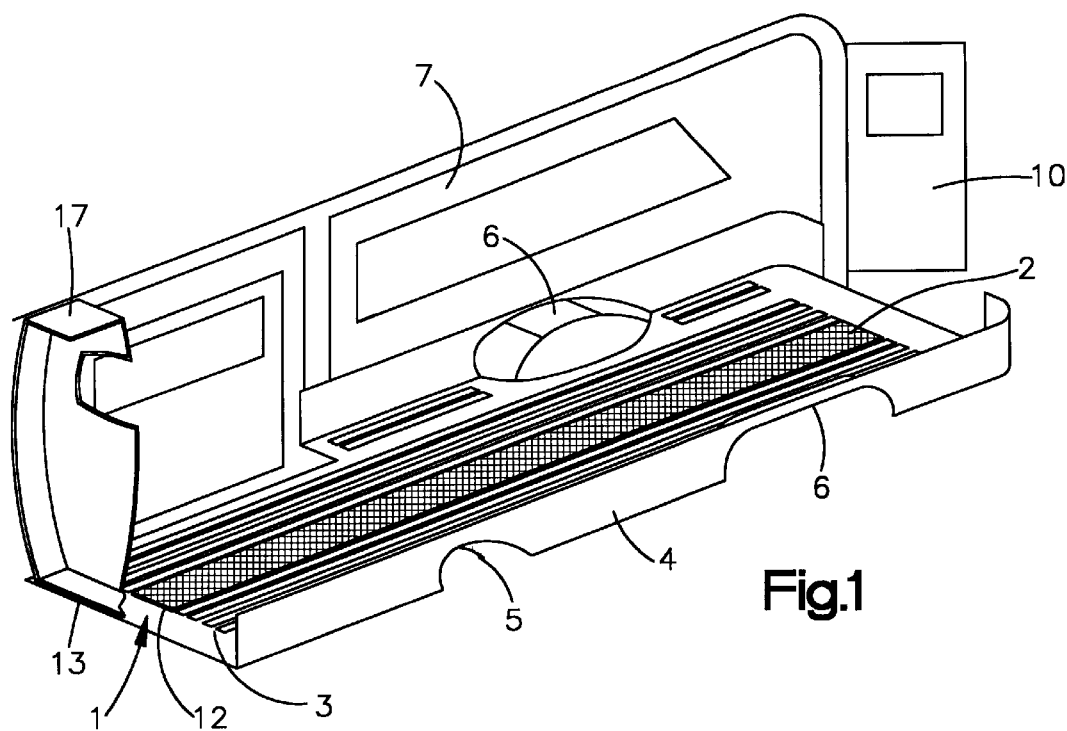
FIG. 1 is a partial sectional view of a typical van interior with a floor liner according to the present invention, and a cargo divider installed.

Referring now to the drawings, FIG. 1 shows a three dimensional view of the floor liner of the present invention and its location within a van 7. The floor liner 1 is formed of a single part plastic (polyethylene) material complete with ribbing 3 for added strength. The primary feature of the ribbing 3 is the lack of ribbing in the recessed center location 12. This recessed center location 12 is designed to serve the function of containing the rubber runner 2. The depth of the recessed center 12 tightly holds the rubber runner 2 into place without use of fasteners thereby allowing the rubber runner 2 to be easily removed for cleaning. This rubber runner 2 can be constructed of virgin rubber, synthetic rubber or recycled rubber and its purpose is to create a non-slip surface for human traffic in the van 7.

The plastic floor liner 1 is formed to accommodate and protect the gas intake cover 5, the wheel well covers 6 and the cargo floor 13 from damage caused by cargo. The liner 1 also incorporates into its design a raised wall 4. This raised wall 4 retains any liquid or dirt within the liner 1. This is crucial to the function of the liner 1 as a protector and to simplify cleaning.

The ribbing 3 is formed into the plastic floor and performs the function of providing a slightly raised floor surface on both sides of the rubber runner 2 and allowing cargo to be carried or slid into the total length of the van. The tough rip resistant plastic ribbing (i.e., relative to rubber) can withstand the demand of cargo weight and the wear and tear of cargo skids on the floor.

The flat section of the cargo floor 13 at the very front of the floor is designed to accommodate cargo divider 17. The flatness allows the cargo divider to be seated and to be sealed with silicone or other sealer to the floor for proper cleaning.

Figure 2:
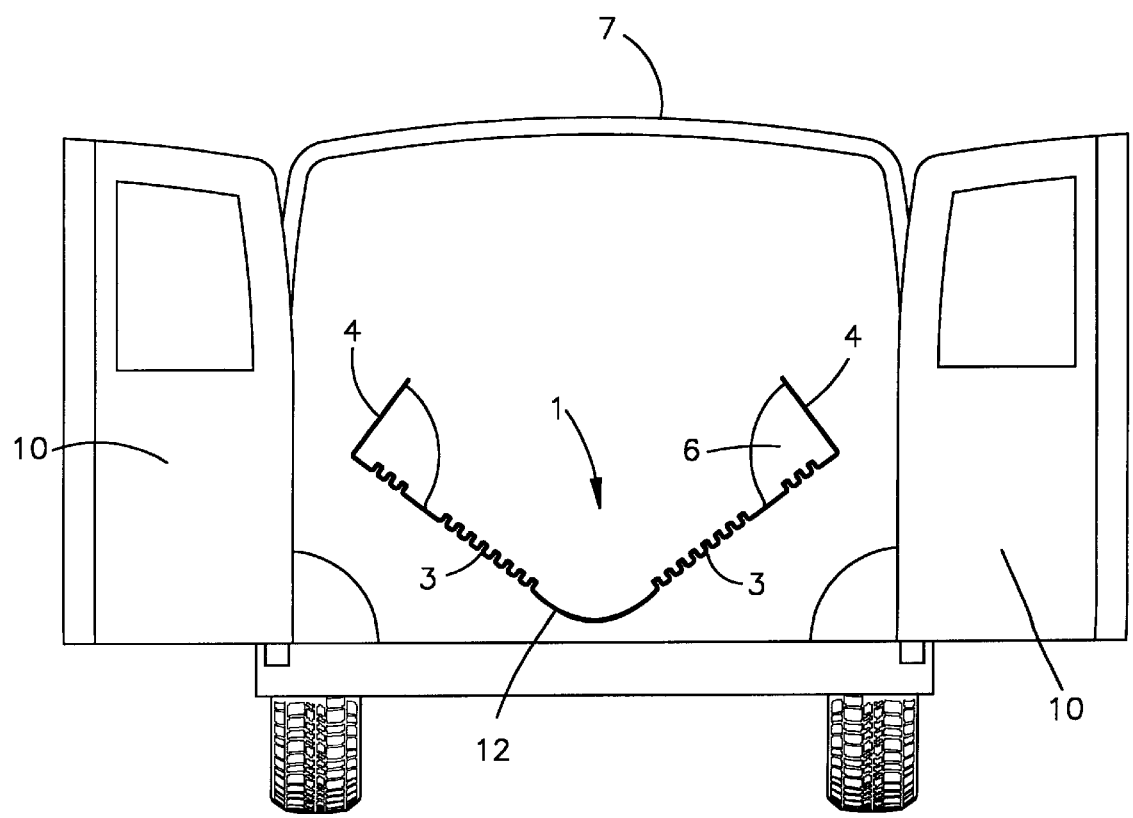
FIG. 2 is an end view of a typical van showing a six foot wide floor liner being installed through a four foot door opening.
Figure 3:
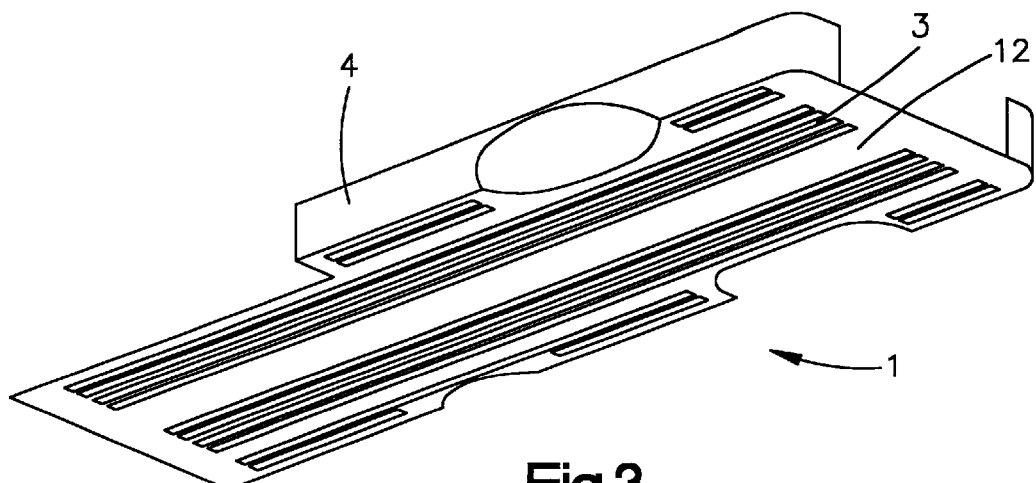
FIG. 3 is a perspective view of a portion of the ribbed plastic liner of the present invention.

FIG. 2 shows a rear view of the interior of the van 7 and the cross-section view of the floor liner 1 as it is installed with partial folding through open rear van doors 10. Referring to FIG. 3, the liner 1 is shown in an installed orientation with the ribbing 3 and center location 12 generally disposed in a flat configuration and the walls 4 projecting upwardly therefrom.

Figure 4:
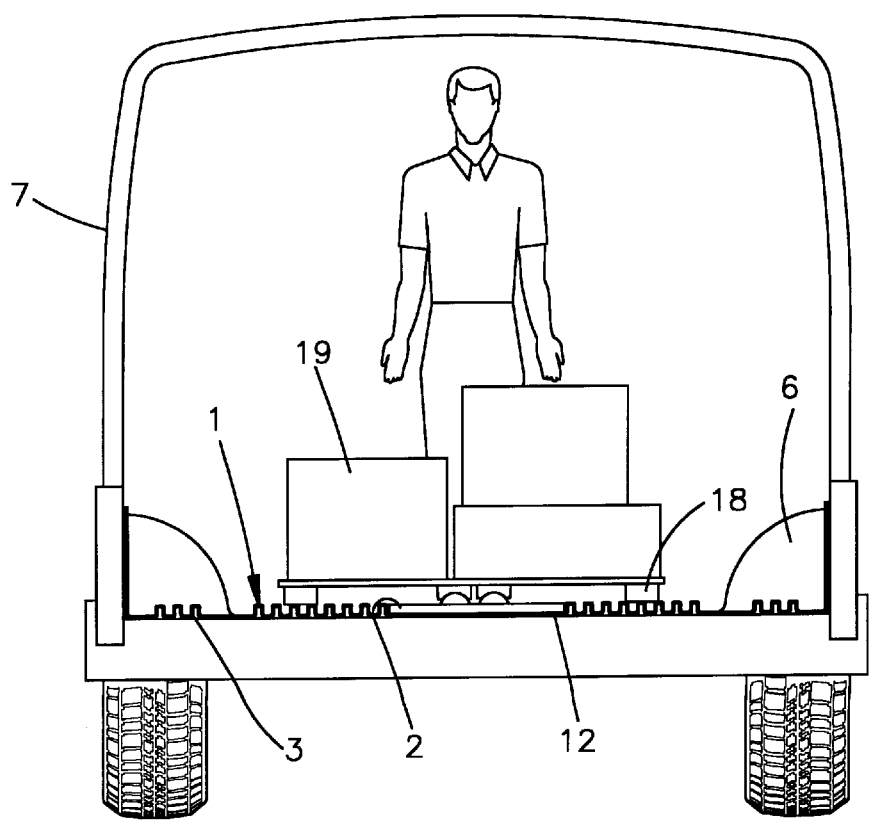
FIG. 4 is a cross-section view of the plastic floor and the rubber runner of the present invention combined with cargo and people.

Illustrated in FIG. 4 is the raised ribbed design 3 and how it carries a skid 18 when using heavy machines such as fork lift trucks. The skid 18 and cargo 19 can be slid the complete length of the van on this ribbed floor 3. The recessed floor in the center 12 allows a person to travel the length of the van on the rubber runner 2 without fear of slipping and falling. This is particularly advantageous when the van is in motion and a person needs to travel the distance of the van floor.

What is claimed is:

1. A removable vehicle cargo area floor liner, said liner comprising:

a central recessed portion which is flexible;

a removable rubber panel inserted into said central recessed portion;

a pair of ribbed raised side portions which flank said central recessed portion and are rigid;

a pair of side walls;

a pair of wheel well cut-outs;

said liner able to be removed for ease of cleaning.

* * * * *